(12) United States Patent
Shirakawa et al.

(10) Patent No.: US 9,659,713 B2
(45) Date of Patent: *May 23, 2017

(54) ELECTRONIC COMPONENT

(71) Applicant: TDK CORPORATION, Tokyo (JP)

(72) Inventors: Yukihiko Shirakawa, Tokyo (JP);
Kazuhiro Nakamura, Tokyo (JP);
Shintaro Kon, Nikaho (JP); Hiromitsu Nogiwa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,192

(22) Filed: Jan. 7, 2016

(65) Prior Publication Data

US 2016/0118193 A1 Apr. 28, 2016

Related U.S. Application Data

(63) Continuation of application No. 14/716,082, filed on May 19, 2015, now Pat. No. 9,263,191, which is a (Continued)

(30) Foreign Application Priority Data

Sep. 7, 2011 (JP) ................................. 2011-195244

(51) Int. Cl.
*H01G 4/30* (2006.01)
*H01G 4/224* (2006.01)
(Continued)

(52) U.S. Cl.
CPC .............. *H01G 4/30* (2013.01); *H01C 1/148* (2013.01); *H01G 4/12* (2013.01); *H01G 4/224* (2013.01);
(Continued)

(58) Field of Classification Search
None
See application file for complete search history.

(56) References Cited

U.S. PATENT DOCUMENTS

| | | | |
|---|---|---|---|
| 3,891,901 A | 6/1975 | Booe et al. | |
| 4,038,587 A | 7/1977 | Kaliebe | |

(Continued)

FOREIGN PATENT DOCUMENTS

| | | |
|---|---|---|
| CN | 1574129 A | 2/2005 |
| CN | 102164981 A | 8/2011 |

(Continued)

OTHER PUBLICATIONS

Dec. 2, 2013 Office Action issued in U.S. Appl. No. 13/601,350.
(Continued)

*Primary Examiner* — Dion R Ferguson
(74) *Attorney, Agent, or Firm* — Oliff PLC

(57) ABSTRACT

An electronic component comprises an element body, an external electrode, and an insulating resin coating layer. The element body has a pair of end faces opposed to each other, a pair of principal faces extending so as to connect the pair of end faces and opposed to each other, and a pair of side faces extending so as to connect the pair of principal faces and opposed to each other. The external electrode is formed so as to cover at least a partial region of the principal face and/or a partial region of the side face and has a plating layer comprised of Sn or an Sn alloy. The insulating resin coating layer covers at least the portion of the external electrode formed so as to cover the side face.

16 Claims, 15 Drawing Sheets

Related U.S. Application Data continuation of application No. 13/601,350, filed on Aug. 31, 2012, now Pat. No. 9,064,623.

(51) Int. Cl.
| | | |
|---|---|---|
| *H01G 4/12* | (2006.01) | |
| *H01C 1/148* | (2006.01) | |
| *H01G 4/232* | (2006.01) | |
| *H01G 4/248* | (2006.01) | |
| *H01G 4/228* | (2006.01) | |

(52) U.S. Cl.
CPC ............ *H01G 4/228* (2013.01); *H01G 4/232* (2013.01); *H01G 4/2325* (2013.01); *H01G 4/248* (2013.01)

(56) References Cited

U.S. PATENT DOCUMENTS

| | | | |
|---|---|---|---|
| 6,903,919 B2 | 6/2005 | Kayatani et al. | |
| 8,716,413 B2 | 5/2014 | Dudde et al. | |
| 9,263,191 B2 * | 2/2016 | Shirakawa | H01C 1/148 |
| 2002/0184788 A1 | 12/2002 | Kawakami et al. | |
| 2003/0087037 A1 | 5/2003 | Honda et al. | |
| 2003/0183251 A1 | 10/2003 | Kawakami et al. | |
| 2004/0240146 A1 | 12/2004 | Kayatani et al. | |

FOREIGN PATENT DOCUMENTS

| | | |
|---|---|---|
| JP | S59-132625 U | 9/1984 |
| JP | H01-283809 A | 11/1989 |
| JP | H02-155209 A | 6/1990 |
| JP | U02-137023 A | 11/1990 |
| JP | H06-244051 A | 9/1994 |
| JP | H09-180957 A | 7/1997 |
| JP | H11-147272 A | 6/1999 |
| JP | H11-251177 A | 9/1999 |
| JP | 2001-267176 A | 9/2001 |
| JP | 2002-075779 A | 3/2002 |
| JP | 2003-243352 A | 8/2003 |
| JP | 2005-012167 A | 1/2005 |
| JP | 2006-013315 A | 1/2006 |

OTHER PUBLICATIONS

Oct. 27, 2014 Office Action issued in U.S. Appl. No. 13/601,350.
May 7, 2015 Office Action issued in U.S. Appl. No. 13/601,350.
Dec. 2, 2013 Notice of Allowance issued in U.S. Appl. No. 13/601,350.
Oct. 7, 2015 Notice of Allowance issued in U.S. Appl. No. 14/716,082.
Aug. 12, 2016 Office Action issued in Japanese Patent Application No. P2011-195244.

* cited by examiner

ELECTRONIC COMPONENT

This is a Continuation of application Ser. No. 14/716,082 filed May 19, 2015, which is a Continuation of application Ser. No. 13/601,350 filed Aug. 31, 2012, which claims the benefit of Application No. JP 2011-195244 filed Sep. 7, 2011. The disclosure of the prior application is hereby incorporated by reference herein in its entirety.

BACKGROUND OF THE INVENTION

Field of the Invention

The present invention relates to an electronic component.

Related Background Art

Known as a surface mounting electronic component (e.g., a multilayer ceramic capacitor) is one comprising an element body having a pair of end faces opposed to each other, a pair of principal faces extending so as to connect the pair of end faces and opposed to each other, and a pair of side faces extending so as to connect the pair of principal faces and opposed to each other and an external electrode formed so as to cover a partial region of the principal face and/or a partial region of the side face and having a plating layer comprised of Sn or an Sn alloy (see, for example, Japanese Patent Application Laid-Open No. 2006-013315). In the electronic component disclosed in Japanese Patent Application Laid-Open No. 2006-013315, the external electrodes, each having a five-face electrode structure (a structure formed over five surfaces of the element body), are formed spreading over both end faces of the base element and partial regions of the principal faces and side faces adjacent to the end faces.

Therefore, as illustrated in FIGS. 10 to 13, when an electronic component 101 is mounted by soldering onto a substrate SS provided with a wiring pattern WP, solder flows around onto external electrodes 103 formed on side faces of the electronic component 101. Solder fillets SF are also formed on side face portions of the external electrodes 103. Hence, when a plurality of electronic components 101 are mounted in parallel or series arrangement, a solder bridge can be formed between end face portions or between the end face portion and the side face portion of adjacent electronic components 101. For this reason, a short-circuit problem is likely to arise between electronic components 101 and it was difficult to realize close adjacent high-density mounting with reduced spacing between electronic components 101. When respective side face portions of the electronic components 101 come into contact with each other because of a positional deviation generated at the time of mounting the electronic components 101 as illustrated in FIG. 14, or when an end face portion of one electronic component 101 and a side face portion of the other electronic component 101 come into contact with each other as illustrated in FIG. 15, there is a fear of electrodes short-circuiting between the electronic components 101.

For solving such a problem, an electronic component in which electrodes are formed only on its bottom face has been proposed (see, for example, Japanese Patent Application Laid-Open No. 2001-267176). In the electronic component disclosed in Japanese Patent Application Laid-Open No. 2001-267176, solder fillets formed at the time of mounting do not exist or are small.

SUMMARY OF THE INVENTION

However, the electronic component disclosed in Japanese Patent Application Laid-Open No. 2001-267176 has the following problems.

The inner structure of the electronic component must be changed greatly from that of conventional electronic components. The external electrodes cannot be formed in facilities used for the conventional electronic components. Surfaces at which inner conductors arranged within the electronic component are exposed must be aligned by some techniques before forming the external electrodes. These greatly increase the cost.

The external electrode has an area much smaller than that of the conventional external electrode having the five-face electrode structure. Therefore, when barrel plating, which is typically used because of its low cost and favorable productivity, is employed for forming the plating layer in the external electrode, the probability of energizing a plating cathode through media (metal balls) is low. As a result, the plating takes a long time, e.g., five times or more that of the conventional one, thereby lowering the productivity. The plating has been known to remarkably worsen the reliability of multilayer ceramic capacitors in particular by infiltrating their element bodies with a plating solution. Hence, the longtime plating has a high risk of lowering reliability.

An electric characteristic of a product is inspected by bringing a contact probe of a measuring device into contact with the external electrode of the electronic component. Since the external electrode is formed on only one specific surface of the electronic component, it is necessary to align the electronic component before bringing the contact probe into contact with the external electrode. Therefore, a new inspecting device is necessary. For aligning small-sized products and then accurately bringing the contact probe into contact with a minute external electrode so as to measure an electric characteristic, it takes time to see the direction of products, align them, and position them highly accurately. This makes it harder to inspect them with favorable productivity.

For overcoming the problems mentioned above, it is an object of the present invention to provide an electronic component which enables close adjacent high-density mounting, while being low in cost and excellent in productivity.

In one aspect, the present invention provides an electronic component comprising an element body having a pair of end faces opposed to each other, a pair of principal faces extending so as to connect the pair of end faces and opposed to each other, and a pair of side faces extending so as to connect the pair of principal faces and opposed to each other; an external electrode formed so as to cover at least a partial region of the principal face and/or a partial region of the side face and having a plating layer comprised of Sn or an Sn alloy; and an insulating resin coating layer covering at least the portion of the external electrode formed so as to cover the side face.

In another aspect, the present invention provides an electronic component comprising an element body having a pair of end faces opposed to each other, a pair of principal faces extending so as to connect the pair of end faces and opposed to each other, and a pair of side faces extending so as to connect the pair of principal faces and opposed to each other; an external electrode formed so as to cover at least a partial region of the principal face and the end face and having a plating layer comprised of Sn or an Sn alloy; and an insulating resin coating layer covering at least the portion of the external electrode formed so as to cover the end face.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference signs, without redundant description.

Figure 1:
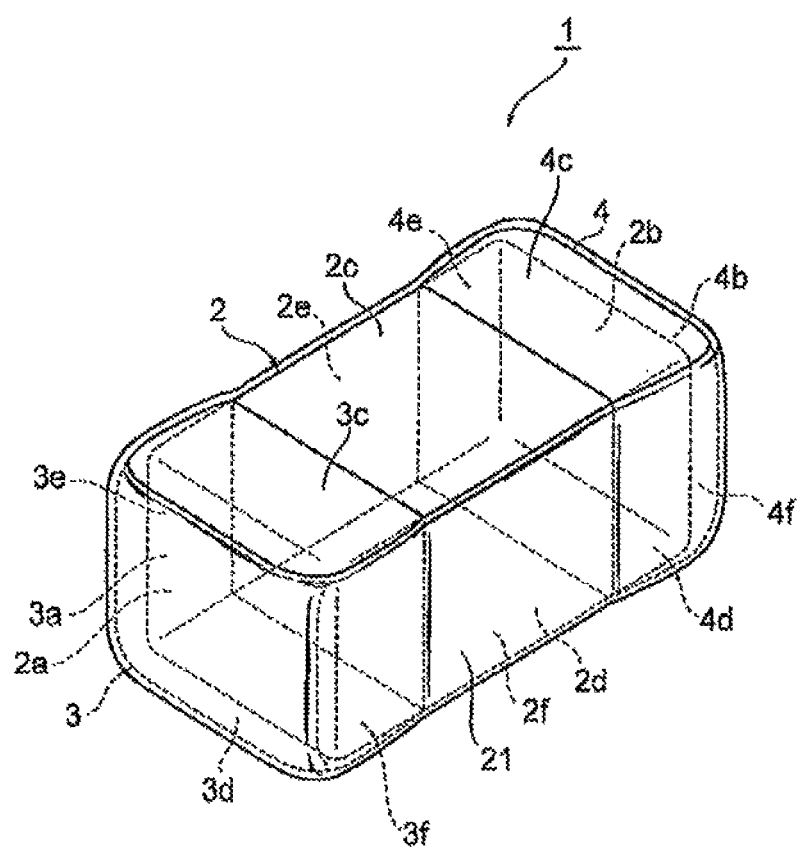
FIG. 1 is a perspective view illustrating the electronic component in accordance with an embodiment.
Figure 2:
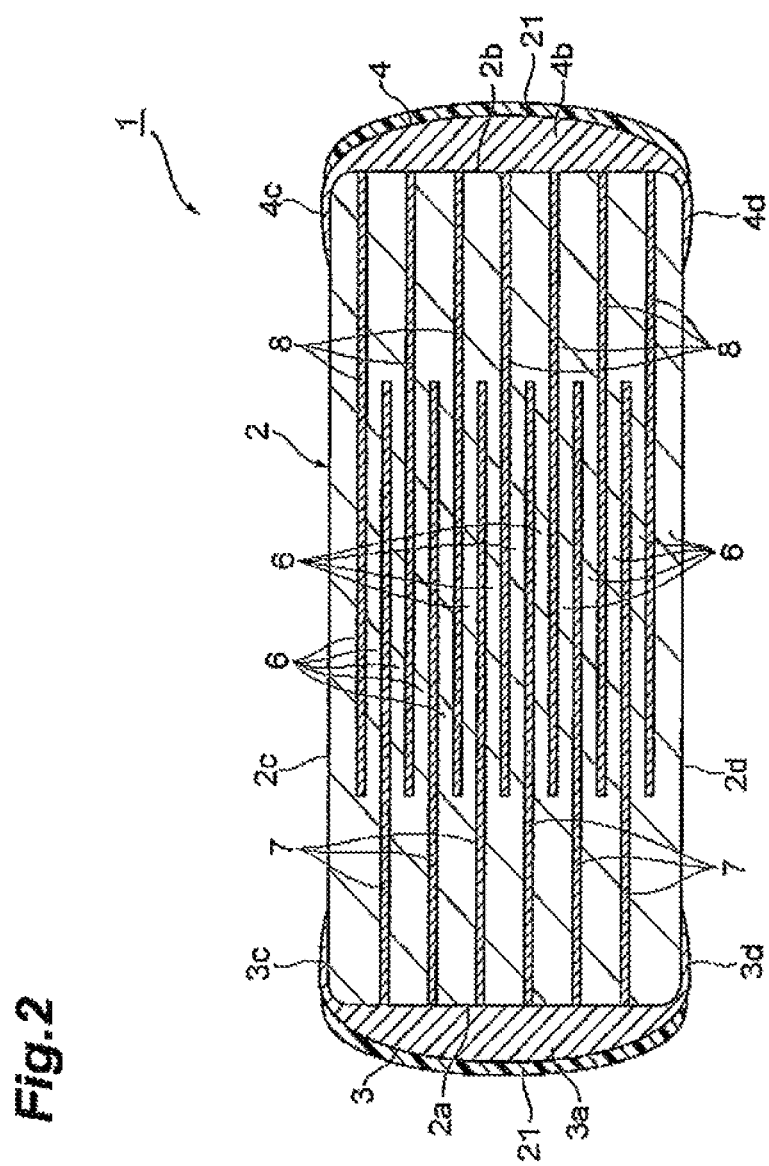
FIG. 2 is a diagram for explaining a cross-sectional configuration of the electronic component in accordance with the embodiment.
Figure 3:
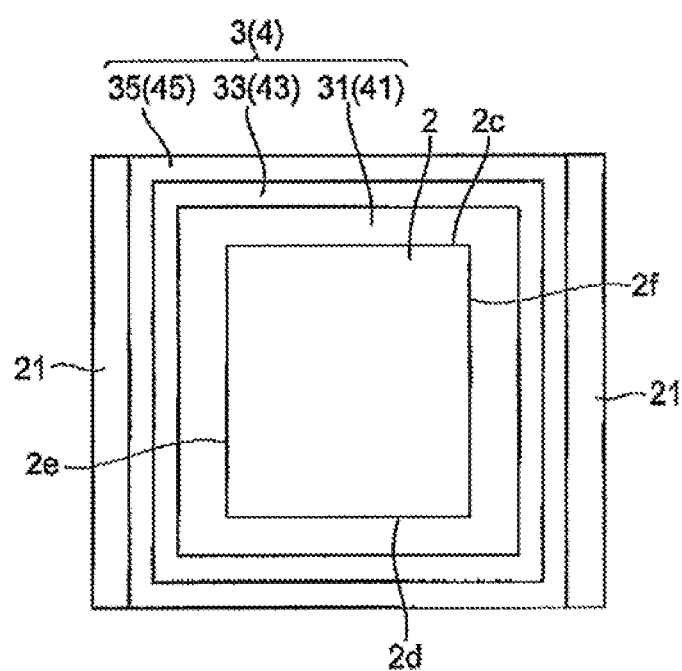
FIG. 3 is a diagram for explaining a cross-sectional configuration of the electronic component in accordance with the embodiment.

With reference to FIGS. 1 to 3, configurations of an electronic component 1 in accordance with an embodiment will be explained. FIG. 1 is a perspective view illustrating the electronic component in accordance with the present embodiment. FIGS. 2 and 3 are diagrams for explaining cross-sectional configuration of the electronic component in accordance with the embodiment. FIG. 3 does not depict internal electrodes 7, 8 which will be explained later and the like.

The electronic component 1, an example of which is a multilayer ceramic capacitor, comprises an element body 2 and a plurality of external electrodes 3, 4. The element body 2 is constructed as a rectangular parallelepiped by stacking and integrating a plurality of ceramic green sheets. As also illustrated in FIG. 1, the element body 2 has a pair of end faces 2a, 2b, a pair of principal faces 2c, 2d, and a pair of side faces 2e, 2f. The pair of end faces 2a, 2b are opposed each other in the longitudinal direction of the element body 2. The pair of principal faces 2c, 2d extend so as to connect the pair of end faces 2a, 2b and are opposed each other. The pair of side faces 2e, 2f extend so as to connect the pair of principal faces 2c, 2d and are opposed each other.

The electronic component 1 is set, for example, in such dimensions as the length of about 0.4 mm to 1.6 mm, the width of about 0.2 mm to 0.8 mm, and the thickness of about 0.4 mm to 0.8 mm.

As illustrated in FIG. 2, the element body 2 is constructed as a multilayer body in which a plurality of rectangular dielectric layers 6, a plurality of internal electrodes 7, and a plurality of internal electrodes 8 are laminated. The internal electrodes 7, 8 are alternately arranged one by one in the lamination direction of the dielectric layers 6 (hereinafter simply referred to as "lamination direction") in the element body 2. Each pair of internal electrodes 7, 8 are arranged so as to oppose each other while interposing at least one dielectric layer 6 therebetween.

Each dielectric layer 6 is comprised of a sintered body of a ceramic green sheet, for example, containing a dielectric ceramic (dielectric ceramic such as $BaTiO_3$, $Ba(Ti,Zr)O_3$, or $(Ba,Ca)TiO_3$ type ceramic). In a practical form of the element body 2, the dielectric layers 6 are integrally formed so that no boundary can be visually recognized between the dielectric layers 6.

The internal electrodes 7, 8 contain an electroconductive material, for example, such as Ni or Cu. The thickness of the internal electrodes 7, 8 is, for example, in the range of about 0.5 μm to 3 μm. There are no particular restrictions on the shape of the internal electrodes 7, 8 as long as they are shaped so as to have mutually overlapping regions when viewed from the lamination direction. The internal electrodes 7, 8 have, for example, a rectangular shape. Each of the internal electrodes 7, 8 is constructed as a sintered body of an electroconductive paste containing the aforementioned electroconductive material. The internal electrodes 7 are electrically and physically connected to the external electrode 3, while the internal electrodes 8 are electrically and physically connected to the external electrode 4.

The external electrode 3 is formed on the end face 2a side of the element body 2. The external electrode 3 is formed so as to cover one end face 2a and partial areas of respective edge regions of the two principal faces 2c, 2d and two side faces 2e, 2f orthogonal to the end face 2a. That is, the external electrode 3 has an electrode portion 3a located on the end face 2a, electrode portions 3c, 3d located on respective portions of the principal faces 2c, 2d, and electrode portions 3e, 3f located on respective portions of the side faces 2e, 2f. The external electrode 3 has a five-face electrode structure.

The external electrode 4 is formed on the end face 2b side of the element body 2. The external electrode 4 is formed so as to cover the other end face 2b and partial areas of respective edge regions of the two principal faces 2c, 2d and two side faces 2e, 2f orthogonal to the end face 2b. That is, the external electrode 4 has an electrode portion 4b located on the end face 2b, electrode portions 4c, 4d located on respective portions of the principal faces 2c, 2d, and electrode portions 4e, 4f located on respective portions of the side faces 2e, 2f. The external electrode 4 has a five-face electrode structure.

The external electrodes 3, 4 are formed by the following technique. A conductive paste mainly composed of Cu, Ni, Ag, Pd, or the like is attached to the outer surface of the element body 2 by a method which will be explained later. Thereafter, the conductive paste is sintered at a predetermined temperature (e.g., about 700° C.) and then furnished with electroplating. Each of the external electrodes 3, 4 has a plating layer formed by the electroplating.

For improving wettability with solder, each of the external electrodes 3, 4 has at least a plating layer comprised of Sn or an Sn alloy in the present embodiment. The plating layer comprised of Sn or an Sn alloy constitutes a surface layer of its corresponding external electrode 3, 4.

The external electrodes 3, 4 may have a plating layer comprised of Ni or an Ni alloy in order to prevent solder and the sintered electrode layer from reacting with each other. In this case, the plating layer comprised of Sn or an Sn alloy is formed after producing the plating layer comprised of Ni or an Ni alloy. The plating layer comprised of Ni or an Ni alloy has a thickness of about 0.5 to 6 μm, and the plating layer comprised of Sn or an Sn alloy has a thickness of about 1 to 7 μm. When the sintered electrode layer is formed by sintering an Ni paste, the plating layer comprised of Ni or an Ni alloy may be omitted.

The external electrodes 3, 4 may have a plating layer comprised of Cu. In this case, the plating layer comprised of Ni or an Ni alloy is formed after producing the plating layer comprised of Cu.

As illustrated in FIG. 3, the external electrodes 3, 4 have respective sintered electrode layers 31, 41, Ni plating layers 33, 43, and Sn plating layers 35, 45.

The electronic component 1 also comprises an insulating resin coating layer 21. As also illustrated in FIGS. 1 and 3, the insulating layer 21 is formed so as to cover the electrode portions 3e, 3f, 4e, 4f located on the side faces 2e, 2f of the element body 2 and the electrode portions 3a, 4b located on the end faces 2a, 2b thereof. The insulating resin coating layer 21 can be formed by applying and solidifying an insulating resin coating agent. Screen printing and the like may be used for applying the insulating resin coating agent.

Preferably, the insulating resin coating layer 21 made by solidifying the insulating resin coating agent is configured such as to yield a thickness within the range of at least 2 μm but not more than 30 μm after solidification.

When solder-mounting the electronic component 1 as a product, the plating layer comprised of Sn or an Sn alloy to become a foundation for the insulating resin coating layer 21 melts. If the insulating resin coating layer 21 is too thin, since this causes the insulating resin coating layer 21 to lack mechanical strength in in-plane directions, so as to crack or delaminate, when the plating layer comprised of Sn or an Sn alloy melts, which is not preferred. If the thickness of the insulating resin coating layer 21 is not more than 2 μm, a region not coated with the insulating resin coating layer 21 may occur, which is not preferred.

If the insulating resin coating layer 21 is too thick, a stress caused by volumetric contraction at the time of solidifying the insulating resin coating layer 21 may become so large that the insulating resin coating layer 21 delaminates at the time of mounting. It will be not preferred if the thickness of the insulating resin coating layer 21 is more than 30 μm, since the following problems may occur. It takes time to dry and solidify. The stress caused by the volumetric contraction at the time of solidifying the insulating resin coating layer 21 may generate defects in the insulating resin coating layer 21 at the time of solidification. The outer size of the electronic component 1 becomes too large.

As the insulating resin coating agent, a thermosetting insulating resin coating agent may be used. For example, the thermosetting epoxy resin coating material using a metal oxide pigment, which is used as a solder resist for printed circuit board, is usable. Also usable is heat-resistant resin coating material, such as a silicone resin coating material, a fluorine resin coating material, a phenolic resin coating material, a urea resin coating material, a melamine resin coating material, an amino resin coating material, an unsaturated polyester resin coating material, a diallyl phthalate resin coating material, a polyurethane resin coating material, a polyimide resin coating material, an alkyd resin coating material, a spirane resin coating material, a thermosetting acrylic resin coating material, a thermosetting methacrylic resin coating material, or a thermosetting copolymer resin coating material, using a metal oxide pigment. A resist material used as a photoresist, e.g., an acrylated epoxy resin or acrylated synthetic rubber, can also be used as the insulating resin coating agent because it has the thermosetting property.

Preferably, an appropriate amount of an organic pigment or an inorganic pigment is added in these insulating resin coating materials to provide the insulating resin coating layer 21 with color or opacity. For example, coloring organic pigments include polycyclic pigments such as phthalocyanine pigments or anthraquinone pigments, or diazo pigments of azo compounds. The inorganic pigments include metal oxides, carbon black, and so on. A pigment with a high refractive index may be used as the aforementioned metal oxide pigment so as to provide the insulating resin coating layer 21 with a moderate light scattering property or substantial opacity.

An UV-curable insulating resin coating agent may be used in place of the thermosetting insulating resin coating agent as the insulating resin coating agent. For example, an acrylated epoxy resin coating material using a metal oxide pigment, which is used as a solder resist for printed circuit board, is usable. It is also possible to use a coating material used as a heat-resistant coating material, such as an acrylated silicone resin coating material, an acrylated fluorine resin coating material, an acrylated phenolic resin coating material, an acrylated polyurethane resin coating material, an acrylated oil coating material, an acrylated alkyd resin coating material, an acrylated polyester coating material, an acrylated polyether coating material, an acrylated spirane resin coating material, or an acrylated copolymer resin coating material, using a metal oxide pigment. The above-mentioned coating materials may also be methacrylated coating materials. It is also possible to use an unsaturated polyester resin coating material or a polyene-polythiol coating material using a metal oxide pigment, which is used as a heat-resistant coating material.

Preferably, an appropriate amount of an organic pigment or an inorganic pigment is added in these heat-resistant resin coating materials so that the insulating resin coating layer 21 can have a color or opacity. Examples of coloring organic pigments include polycyclic pigments of phthalocyanine pigments or anthraquinone pigments, or diazo pigments of azo compounds. Examples of the inorganic pigments include metal oxides, carbon black, and so on. The aforementioned metal oxide pigment may be one with a high refractive index, whereby the insulating layer 21 has a moderate light scattering property, or substantial opacity.

As the insulating resin coating agent, a thermosetting insulating resin coating agent introduced in a UV-curable insulating resin coating agent may also be used. For example, those in which an epoxy resin coating material with a salt of a Lewis acid, an acid-curable amino alkyd resin coating material with an acid generating agent, or any one of the various resins of the aforementioned thermosetting insulating resin coating agents, using a metal oxide pigment, which is used as a heat-resistant coating material, is introduced in various UV-curable insulating resin coating agents can be used. It is also possible to use an acrylated epoxy resin photoresist or an acrylated synthetic rubber photoresist.

In the process of packing the electronic component 1 into a packaging material (packaging process), the electronic component 1 is packed with its orientation aligned. For example, the electronic component 1 is packed such that the principal face 2c is oriented to an opening of the packaging material. When the insulating resin coating layer 21 is colored or opaque, the principal faces 2c, 2d formed with the insulating resin coating layer 21 and the side faces 2e, 2f free of the insulating resin coating layer 21 can easily be distinguished from each other. For distinguishing them from each other, a spectrocolorimeter may be used, for example. The spectrocolorimeter measures luminance values L in the CIE (Commission Internationale d'Eclairage) 1976 L*a*b* (CIELAB) (JIS Z8729).

Figure 4:
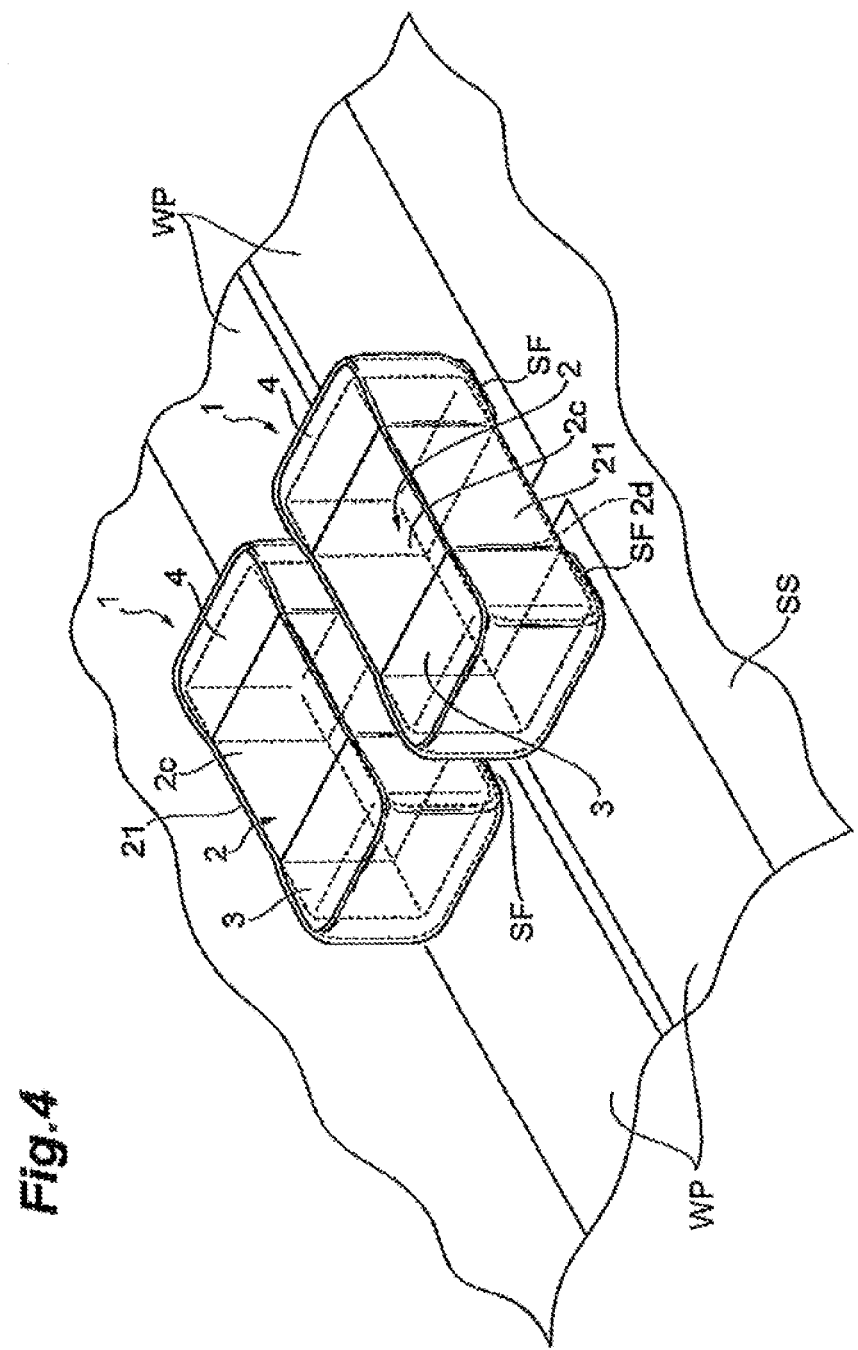
FIG. 4 is a perspective view illustrating an example of mounting the electronic component in accordance with the embodiment.
Figure 5:
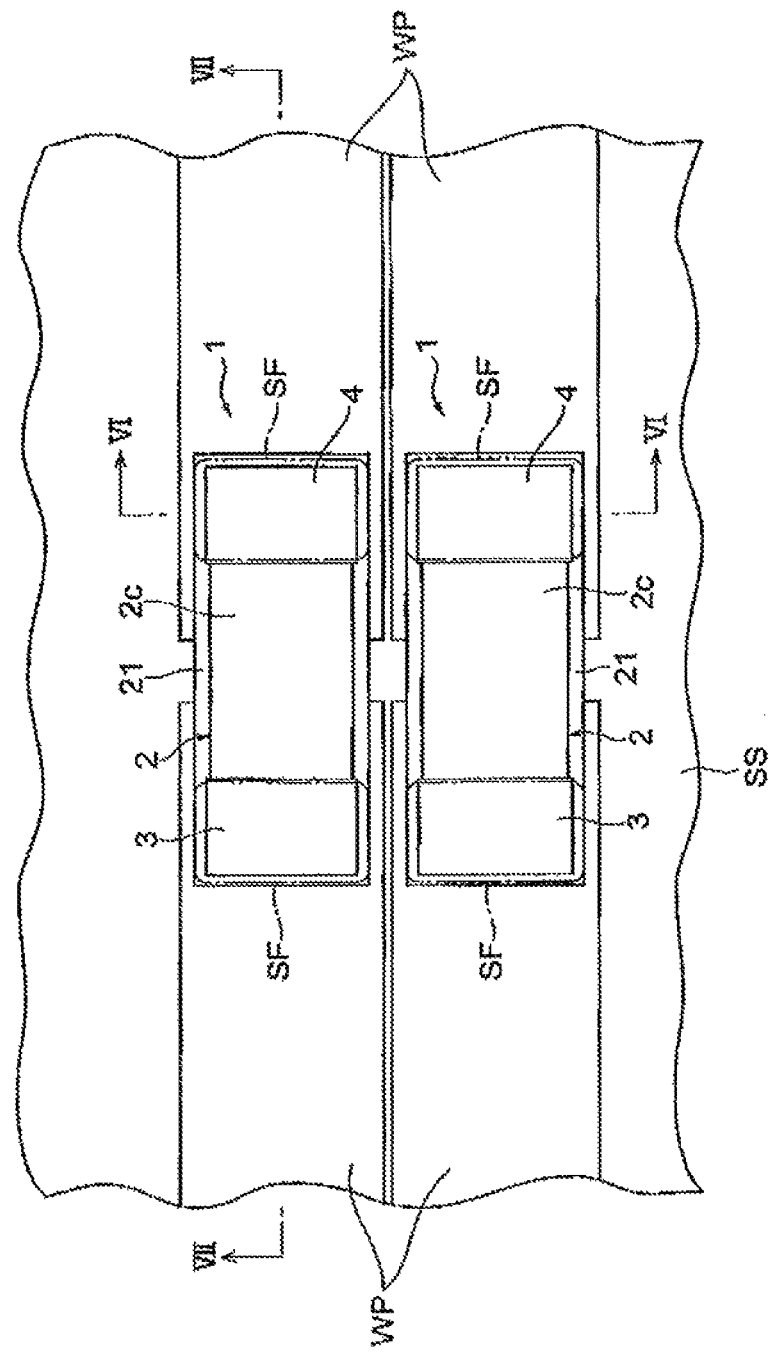
FIG. 5 is a plan view illustrating the example of mounting the electronic component in accordance with the embodiment.
Figure 6:
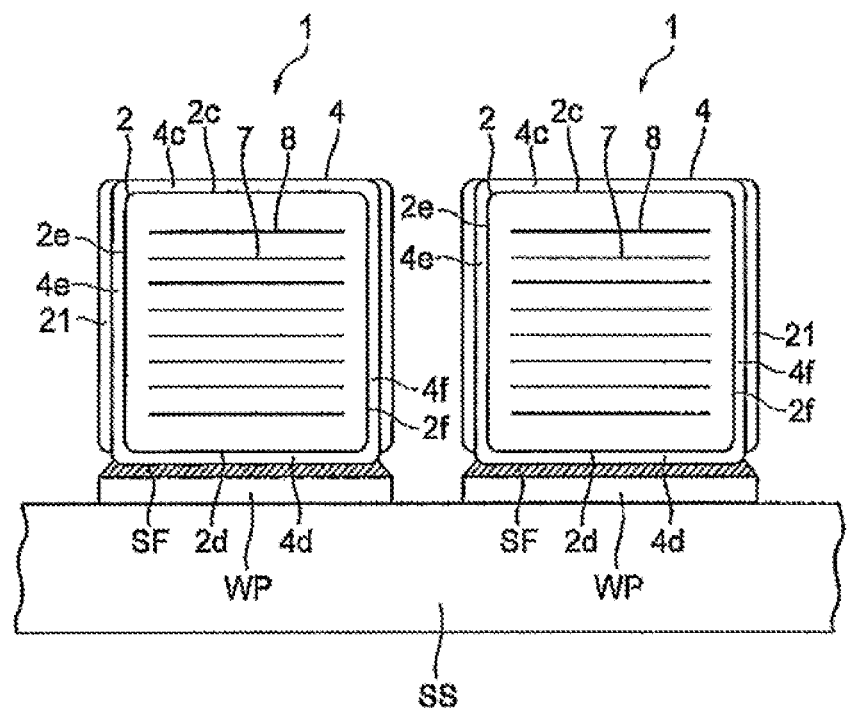
FIG. 6 is a diagram for explaining a cross-sectional configuration taken along the line VI-VI of FIG. 5.
Figure 7:
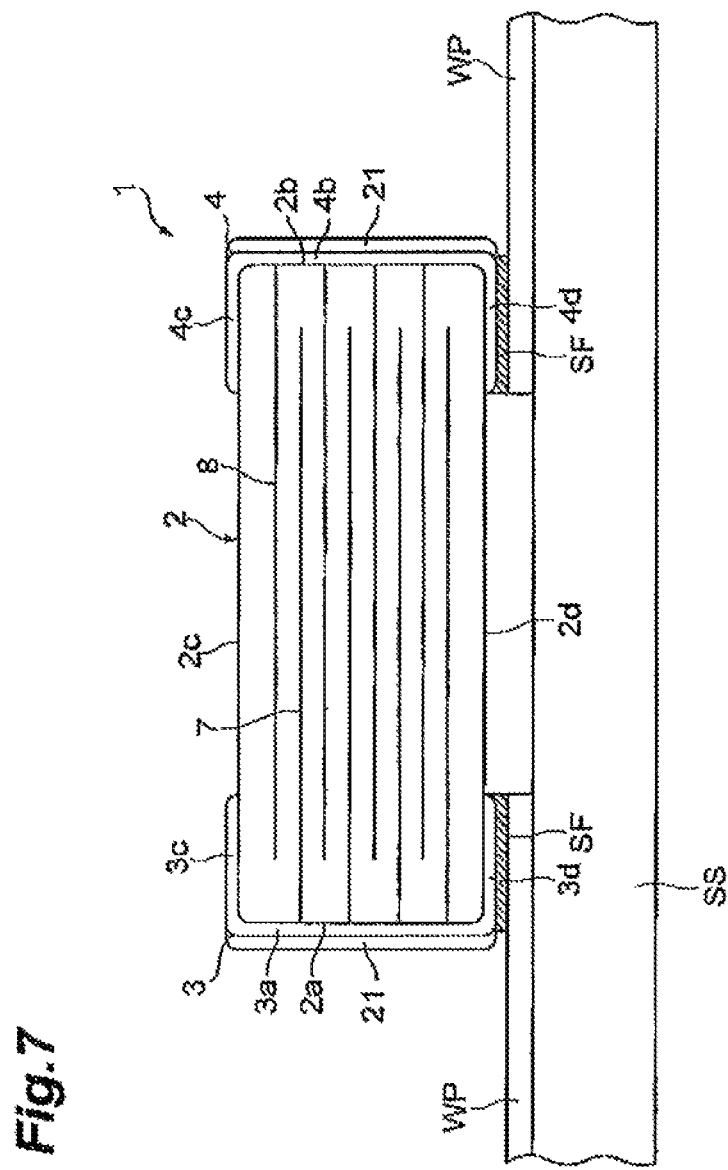
FIG. 7 is a diagram for explaining a cross-sectional configuration taken along the line VII-VII of FIG. 5.
Figure 8:
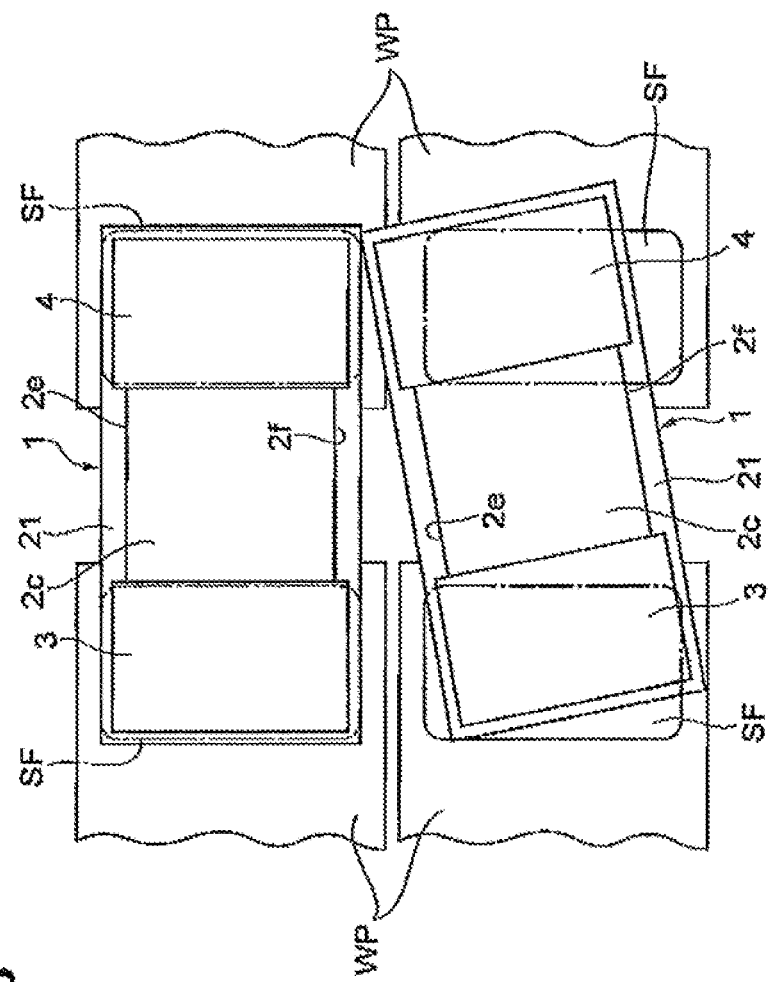
FIG. 8 is a plan view illustrating another example of mounting the electronic component in accordance with the embodiment.
Figure 9:
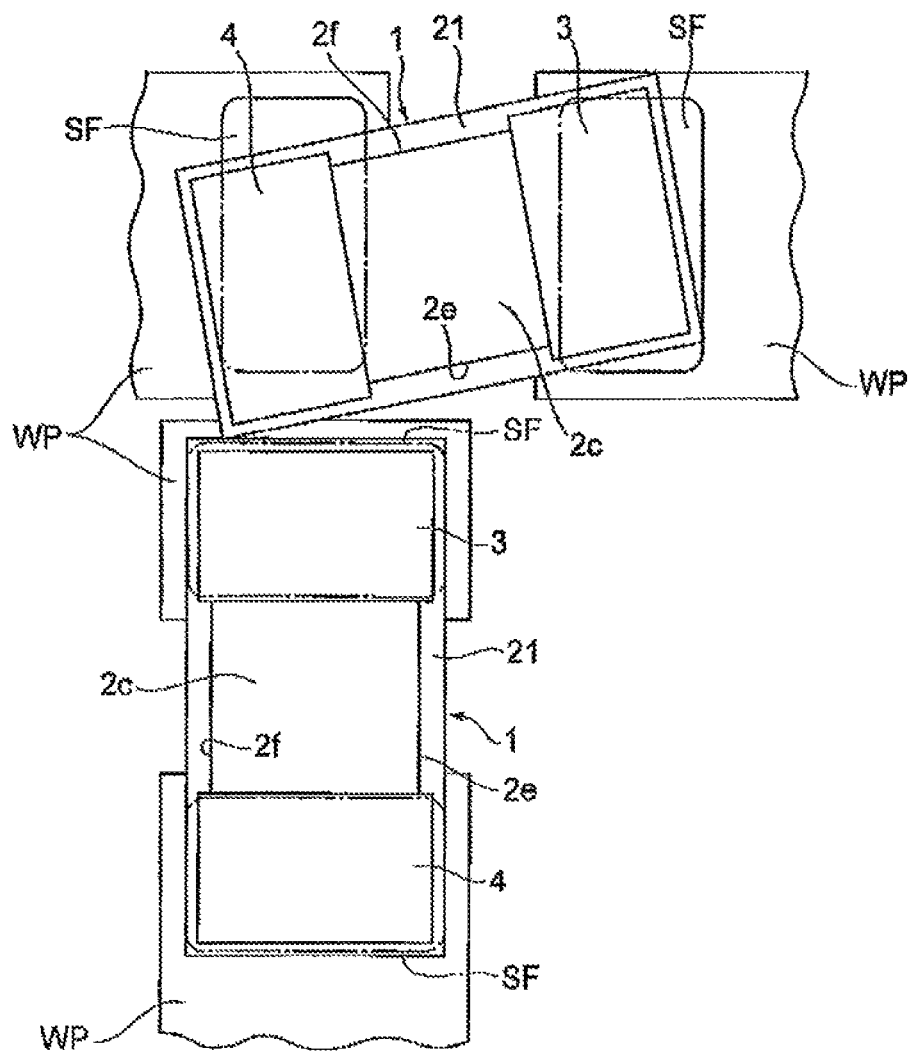
FIG. 9 is a plan view illustrating still another example of mounting the electronic component in accordance with the embodiment.
Figure 10:
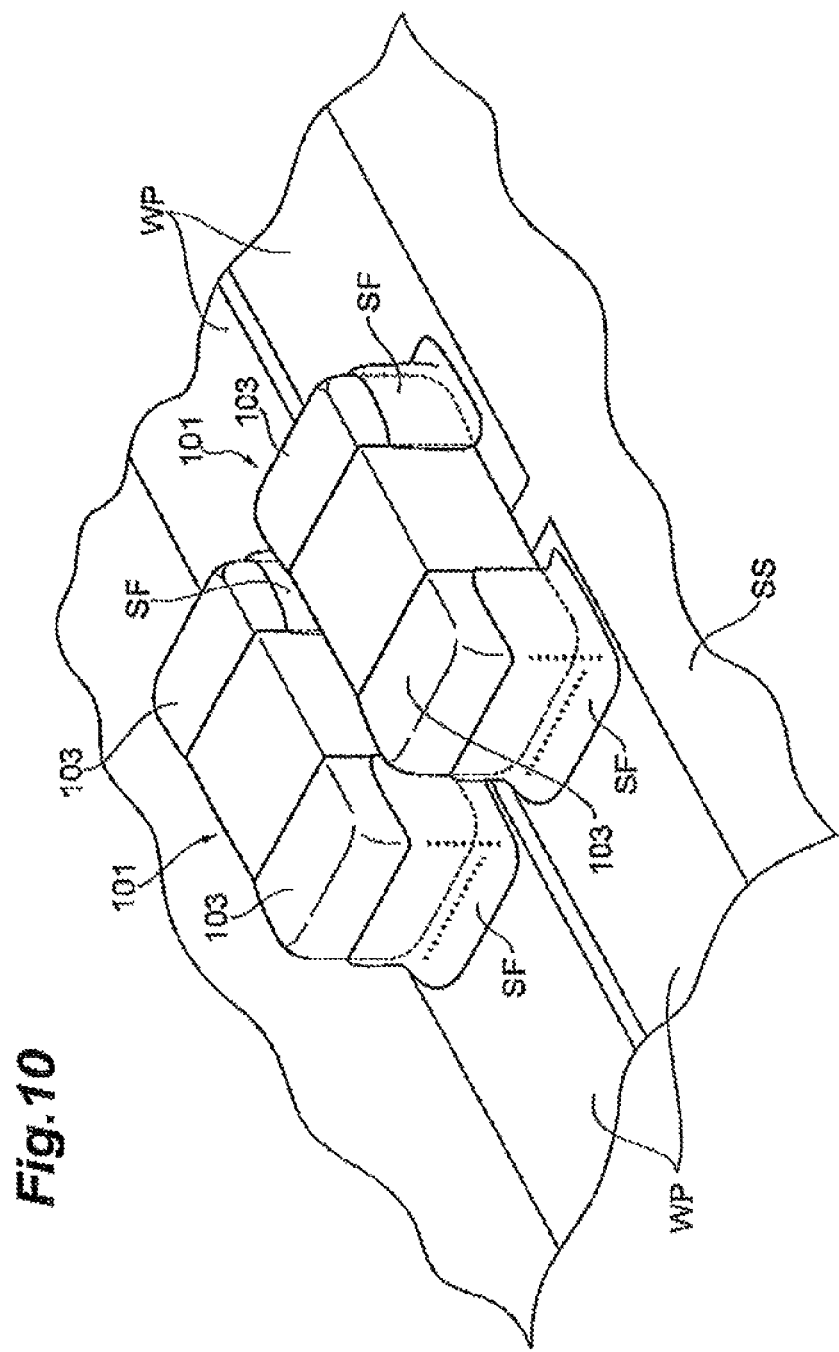
FIG. 10 is a perspective view illustrating an example of mounting conventional electronic components.
Figure 11:
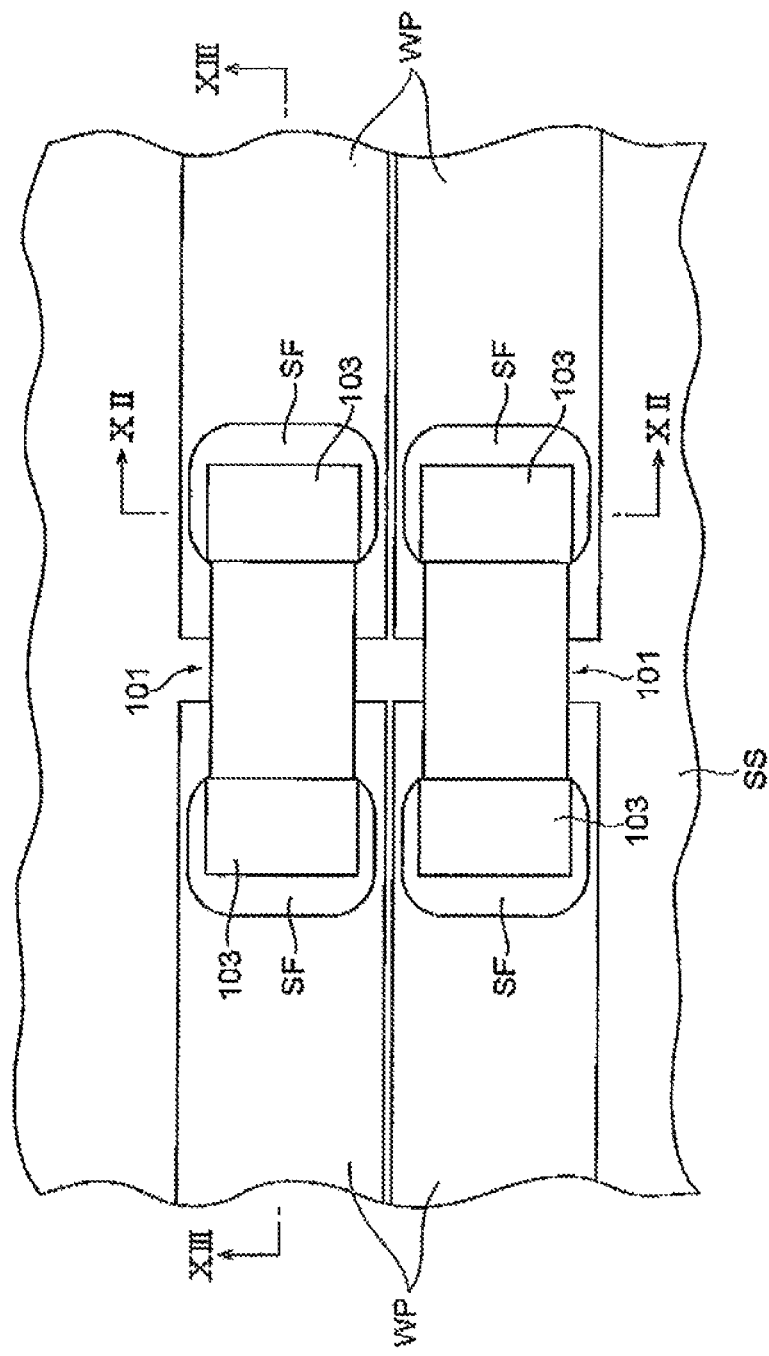
FIG. 11 is a plan view illustrating the example of mounting the conventional electronic components.
Figure 12:
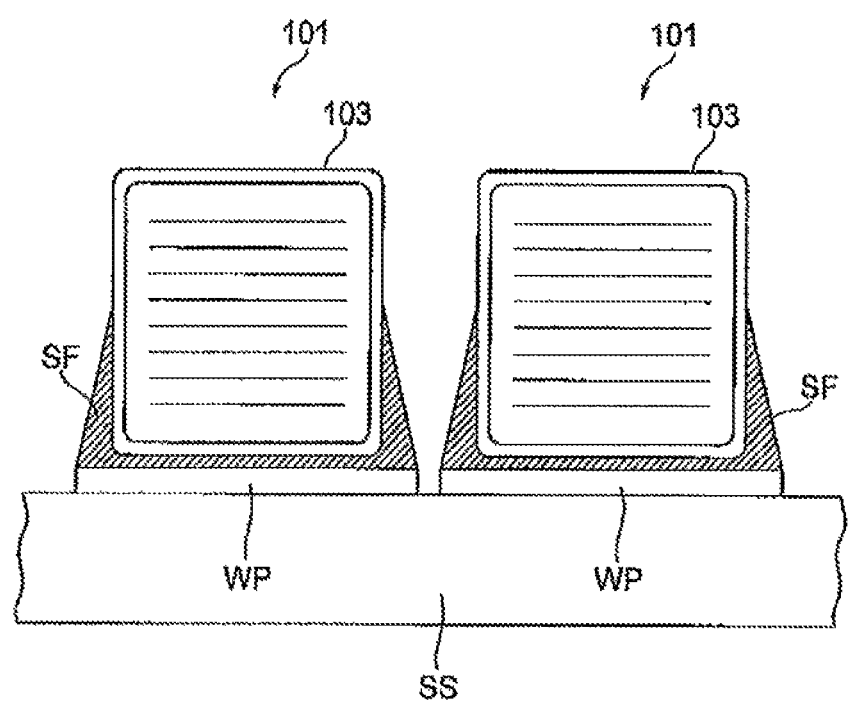
FIG. 12 is a diagram for explaining a cross-sectional configuration taken along the line XII-XII of FIG. 11.
Figure 13:
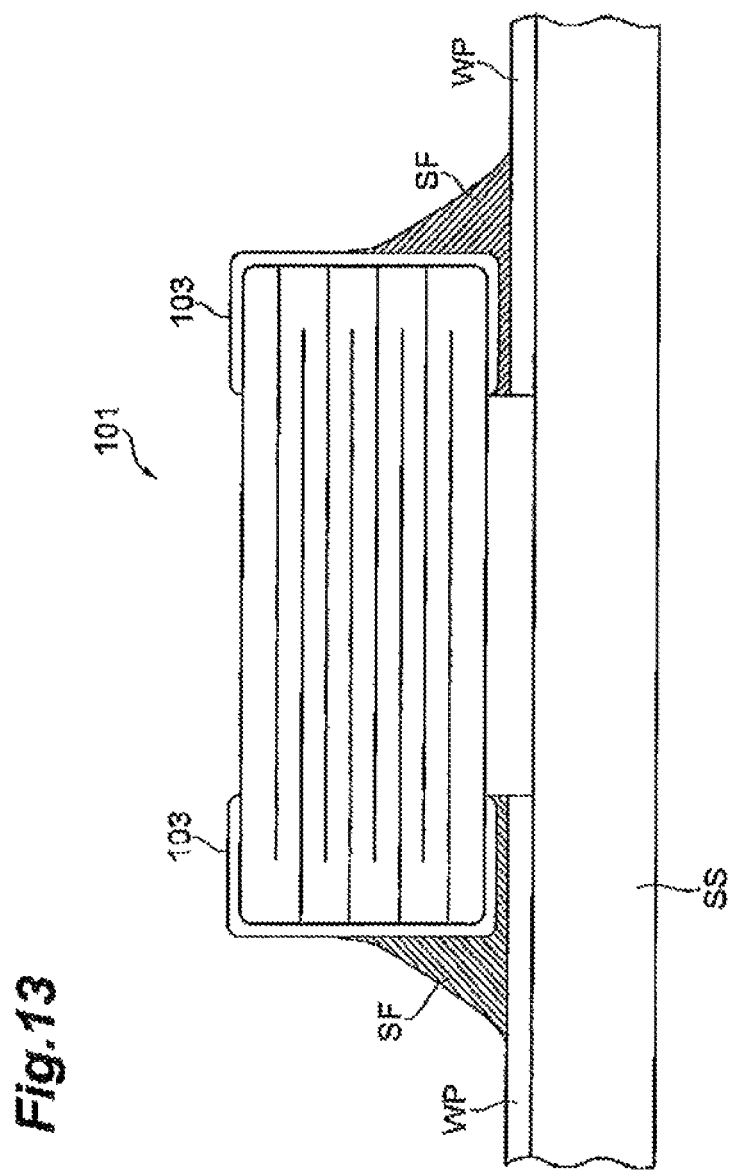
FIG. 13 is a diagram for explaining a cross-sectional configuration taken along the line XIII-XIII of FIG. 11.
Figure 14:
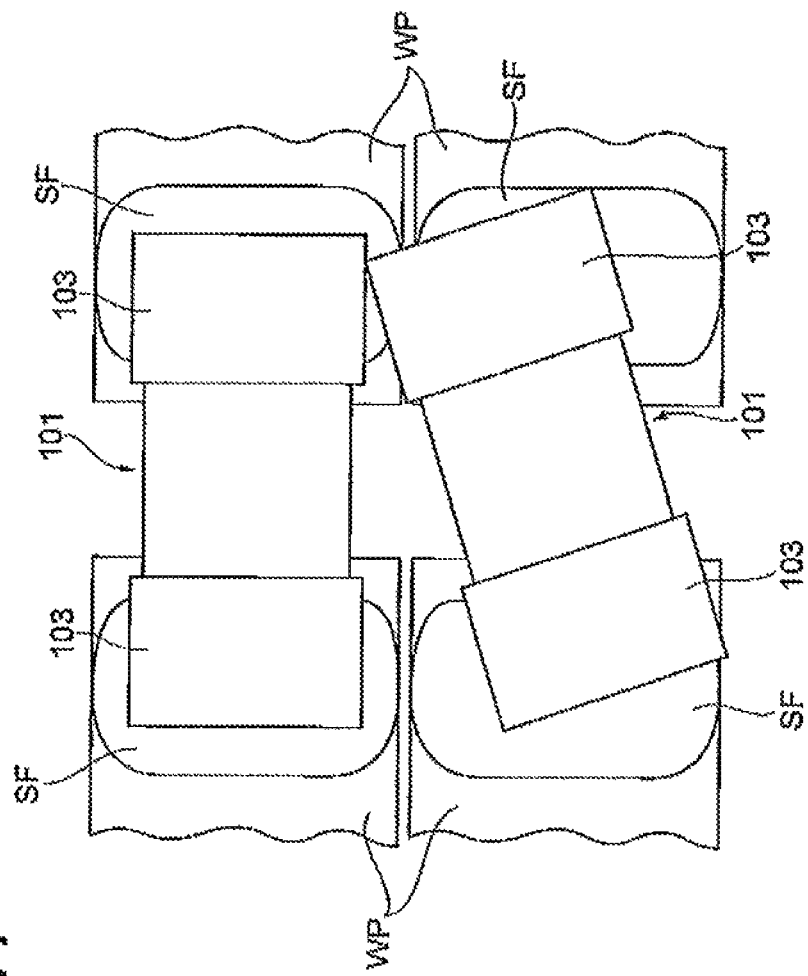
FIG. 14 is a plan view illustrating another example of mounting the conventional electronic components.
Figure 15:
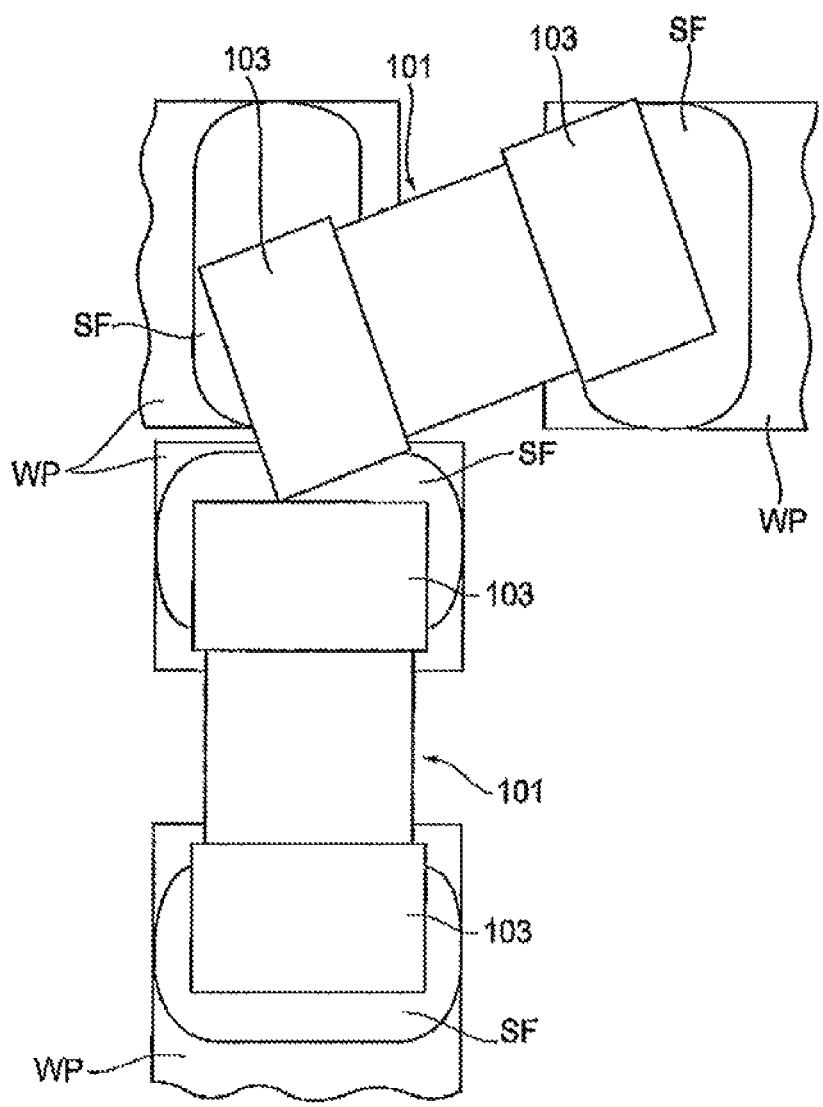
FIG. 15 is a plan view illustrating still another example of mounting the conventional electronic components.

With reference to FIGS. 4 to 9, examples of mounting the electronic component 1 will now be explained. FIG. 4 is a perspective view illustrating an example of mounting the electronic component in accordance with the present embodiment. FIGS. 5, 8, and 9 are plan views illustrating examples of mounting the electronic component in accordance with the present embodiment. FIG. 6 is a diagram for explaining a cross-sectional configuration taken along the line VI-VI of FIG. 5. FIG. 7 is a diagram for explaining a cross-sectional configuration taken along the line VII-VII of FIG. 5. FIGS. 6 and 7 hatch only solder fillets SF which will be explained later.

The electronic component 1 is taken out from the packaging material, so as to be mounted on a substrate. The packaged electronic component 1 is taken out from the packaging material, using a suction head of a surface-mount mounter. Here, a suction nozzle abuts against the principal face 2c, since the electronic component 1 is packed such that the principal face 2c is oriented to the opening of the packaging material. As a consequence, the principal face 2d opposite from the principal face 2c is located closer to the mount surface of the mounting substrate.

When mounting the electronic component 1, its external electrodes 3, 4 are electrically connected to a wiring pattern WP of a substrate SS by solder reflow. Therefore, as illustrated in FIGS. 4 to 7, the electronic component 1 is mounted by soldering. As the solder, those in conformity to ISO FDIS 9453:2005 (JIS Z 3282:2006), such as Sn—Sb, can be used without wetting the above-mentioned insulating resins.

Since the solder wets only metals, the insulating resin coating layer 21 functions as a solder resist layer. Therefore, when the electronic component 1 is mounted to the mounting substrate with the principal face 2d located closer to the substrate surface, the solder does not flow up over the electrode portions 3a, 3e, 3f, 4b, 4e, 4f in the electronic component 1. Hence, the solder fillets SF are not formed there, whereby close adjacent high-density mounting is possible.

Even when the electronic components 1 are mounted closely adjacent to each other, there are no solder fillets SF on the sides of side faces 2e, 2f and on the sides of end faces 2a, 2b as illustrated in FIGS. 4 to 7. Therefore, no short-circuiting is generated by solder bridges between the components adjacent to each other.

Even if a positional deviation in mounting causes an electronic component 1 to come into contact with a portion on the side face 2e, 2f side or with a portion on the end face 2a, 2b side of an electronic component 1 adjacent thereto, as shown in FIGS. 8 and 9, an electrode-electrode short will not occur between the two electronic components 1 because of the existence of the insulating resin coating layer 21.

When mounting a plurality of electronic components 1 in parallel, the insulating resin coating layer 21 covering at least the electrode portions 3e, 3f, 4e, 4f can prevent the electrode portions 3e, 3f, 4e, 4f of the electronic components 1 adjacent to each other from short-circuiting. When mounting a plurality of electronic components 1 in series, the insulating resin coating layer 21 covering at least the electrode portions 3a, 4b can prevent the electrode portions 3a, 4b of the electronic components 1 adjacent to each other from short-circuiting. Regardless of how a plurality of electronic components 1 are arranged at the time of mounting, the insulating resin coating layer 21 covering at least the electrode portions 3a, 3e, 3f, 4b, 4e, 4f can prevent the electrode portions 3a, 3e, 3f, 4b, 4e, 4f of the electronic components 1 adjacent to each other from short-circuiting.

The electronic component 1 in accordance with the present embodiment can use the same manufacturing process as that of typical electronic components having a five-face electrode structure. Therefore, no new device for manufacturing the electronic component 1 is necessary, whereby the electronic component 1 can be manufactured at a low cost without capital investment.

In the case of the conventional electronic component where the external electrodes are formed on the bottom face only, the positions of the external electrodes are limited solely to the bottom face. In an electrical characteristic test and screening after completion of a product, therefore, it is necessary to align the product and bring a contact probe into contact therewith, which requires a new test device. For performing the electrical characteristic test with the contact probe being kept accurately in contact with a small electrode portion in an aligned state of a compact product such as a product with the outside shape of 0603 type having the dimensions of 0.6 mm×0.3 mm×0.3 mm or a product with the outside shape of 0402 type having the dimensions of 0.4 mm×0.2 mm×0.2 mm, a lot of time and effort is needed for check of direction, alignment, and high-accuracy positioning of the product. Therefore, it is difficult to perform the test with good productivity.

In the present embodiment, the process of forming the insulating resin coating layer 21 is carried out after completion of the sintering process of the sintered electrode layers 31, 41 at high temperature and the plating process with great mechanical and electrochemical loads, which significantly affect the electrical characteristics and reliability of the electronic component 1.

Even if the characteristic test and screening operation of the electronic component 1 is carried out before the formation of the insulating resin coating layer 21, it will not degrade the electrical characteristics and reliability of the product completed finally. Namely, the electrical characteristic test and screening can be carried out using the electrical characteristic test system with good productivity which has been used for the conventional electronic components of the five-face electrode structure. Therefore, no capital investment is necessary for the inspecting device either, whereby electric characteristics can be inspected with favorable productivity.

In the present embodiment, the insulating resin coating layer 21 is formed after formation of the plating layer comprised of Sn or an Sn alloy.

For example, Sn constituting the Sn plating layers 35, 45 has a melting point of 231.9° C. Therefore, the Sn plating layers 35, 45 melt when mounted at 250° C., which is the peak temperature of a reflow furnace of typical lead-free solder. Hence, an ordinary inorganic coating film formed on the Sn plating layers 35, 45 can become delaminated or self-destroyed. In the electronic component 1 of the present embodiment, however, the insulating resin coating layer 21 is flexible and thus can absorb distortions caused by the melting of the Sn plating layers 35, 45 serving as its foundation. As a result, no delamination problem of the insulating resin coating layer 21 occurs at the time of reflowing.

The insulating resin coating layer 21 is flexible, thereby being resistant to mechanical impacts at the time of handling the product. This can make it possible to form the highly reliable electronic component 1.

Electronic components of a surface mounting type in general are supplied in the form of a taping package accommodating individual components in pockets of a carrier tape by a taping device. The taping-packaged electronic components are picked up from the pockets of the carrier tape by the suction head of the surface mounter, so as to be mounted on the mounting substrate. The mounting direction of the electronic component at the time of mounting is determined by the direction in which the electronic component is accommodated in the pocket of the carrier tape.

The electronic component 1 of the present embodiment is mounted on the mounting substrate while being aligned such that the principal faces 2c, 2d free of the insulating resin coating layer 21 are parallel to the mount surface of the mounting substrate. This allows the insulating resin coating layer 21 to exhibit its effect, thereby enabling close adjacent high-density mounting. It is necessary to align and tape the principal faces 2c, 2d free of the insulating resin coating layer 21 in each pocket of the carrier tape.

For aligning the electronic components 1, it is necessary to sort out misaligned components by optically inspecting their appearances with a camera or spectrocolorimeter. Since the insulating resin coating layer 21 is optically opaque or colored, the alignment can be performed highly accurately at high speed. The insulating resin coating layer 21 may be optically opaque or colored to such an extent that whether it exists or not is discernible by an optical inspection. The colors of the electrode portions 3a, 3e, 3f, 4b, 4e, 4f, end faces 2a, 2b, and side faces 2e, 2f formed with the insulating resin coating layer 21 are not required to be hidden completely.

Though a preferred embodiment of the present invention has been explained in the foregoing, the present invention is not necessarily limited to the above-mentioned embodiment but can be modified in various ways within the scope not deviating from the gist thereof.

The insulating resin coating layer 21 covers the side faces 2e, 2f in the present embodiment, but is not required to do so. It is sufficient for the insulating resin coating layer 21 to cover at least the electrode portions 3e, 3f, 4e, 4f. That is, in the side faces 2e, 2f, the regions exposed from the electrode portions 3e, 3f, 4e, 4f may be free of the insulating resin coating layer 21.

Though the embodiment has been explained in connection with a multilayer ceramic capacitor as an electronic component by way of example, the present invention is not limited thereto, but is also applicable to other electronic components such as multilayer inductors, multilayer varistors, multilayer piezoelectric actuators, multilayer thermistors, and multilayer composite components.

Though the electronic component is exemplified by the electronic component 1 having a five-face electrode structure in the above-mentioned embodiment, the present invention is not restricted thereto. Similar effects can also be obtained in so-called C-shaped three-face electrode structures in which one of the side faces 2e, 2f and principal faces 2c, 2d of the element body 2 is free of external electrodes as in chip resistors or L-shaped two-face electrode structures in which external electrodes are formed on any of the end faces 2a, 2b and only one of the side faces 2e, 2f and principal faces 2c, 2d. Electronic components having multiterminal external electrodes, such as multilayer capacitor arrays and chip-type three-terminal feedthrough multilayer capacitor arrays, also yield similar effects.

In the electronic components having a three- or two-face electrode structure, it will be sufficient if the insulating resin coating layer 21 covers at least the electrode portions 3a, 4b.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An electronic component comprising:
   an element body including first and second principal faces opposed to each other, and four faces extending to connect the first principal face and the second principal face;
   an external electrode including an electrode portion disposed on at least a partial region of the first principal face and an electrode portion disposed on at least a partial region of a one of the four faces; and
   a solder resist layer disposed to surround the four faces, the solder resist layer being an insulating layer that is solder resistive,
   wherein a portion of the first principal face is exposed from both the external electrode and the insulating is layer.

2. An electronic component according to claim 1, wherein the insulating layer is a resin coating layer.

3. An electronic component according to claim 2, wherein a thickness of the resin coating layer is in the range of at least 2 μm but not more than 30 μm.

4. An electronic component according to claim 1, wherein the external electrode includes a sintered electrode layer.

5. An electronic component according to claim 1, wherein the external electrode includes a plating layer.

6. An electronic component according to claim 5, wherein the plating layer is made of Sn or an Sn alloy.

7. An electronic component comprising:
   an element body including first and second end faces opposed to each other, first and second principal faces opposed to each other, and first and second side faces opposed to each other;
   a first external electrode including a first electrode portion disposed on the first end face, second electrode portions disposed on the first and second principal faces, and third electrode portions disposed on the first and second side faces;

a second external electrode including a fourth electrode portion disposed on the second end face, fifth electrode portions disposed on the first and second principal faces, and sixth electrode portions disposed on the first and second side faces; and a solder resist layer covering all of the first electrode portion, the third electrode portions, the fourth electrode portion, and the sixth electrode portions, the solder resist layer being an insulating layer that is solder resistive, wherein a portion of the first principal face is exposed from both the first and second external electrode and the insulating layer.

8. An electronic component according to claim 7, wherein the insulating layer further covers portions of the first and second side faces exposed from the third electrode portions and the sixth electrode portions.

9. An electronic component according to claim 7, the insulating layer disposed to surround the first and second end faces and the first and second side faces.

10. An electronic component according to claim 7, wherein the insulating layer is further a resin coating layer.

11. An electronic component according to claim 10, wherein a thickness of the resin coating layer is in the range of at least 2 μm but not more than 30 μm.

12. An electronic component according to claim 7, wherein the external electrode includes a sintered electrode layer.

13. An electronic component according to claim 7, wherein the external electrode includes a plating layer.

14. An electronic component according to claim 13, wherein the plating layer is made of Sn or an Sn alloy.

15. An electronic component according to claim 1, wherein the insulating layer is made of a thermosetting insulating resin, a UV-curable insulating resin, or a thermosetting insulating resin introduced in a UV-curable insulating resin.

16. An electronic component according to claim 7, wherein the insulating layer is made of thermosetting insulating resin, a UV-curable insulating resin, or a thermosetting insulating resin introduced in a UV-curable insulating resin.

* * * * *